US012687392B2

(12) United States Patent
Almaguer

(10) Patent No.: US 12,687,392 B2
(45) Date of Patent: Jul. 21, 2026

(54) TOOL FOR LEVELING AND ALIGNING SUSPENDED CEILING RAILS

(71) Applicant: A-Team Constructions, LLC, San Antonio, TX (US)

(72) Inventor: Jorge Almaguer, San Antonio, TX (US)

(73) Assignee: A-Team Constructions, LLC, San Antonio, TX (US)

( * ) Notice: Subject to any disclaimer, the term of this patent is extended or adjusted under 35 U.S.C. 154(b) by 403 days.

(21) Appl. No.: 18/141,293

(22) Filed: Apr. 28, 2023

(65) Prior Publication Data

US 2023/0349694 A1 Nov. 2, 2023

Related U.S. Application Data

(60) Provisional application No. 63/337,067, filed on Apr. 30, 2022.

(51) Int. Cl.
*G01C 9/02* (2006.01)
*E04B 9/30* (2006.01)
*E04F 21/18* (2006.01)

(52) U.S. Cl.
CPC . *G01C 9/02* (2013.01); *E04B 9/30* (2013.01)

(58) Field of Classification Search
CPC ... G01C 9/02; E04B 9/30; E04B 9/306; E04F 21/185
USPC .......................................................... 33/301
See application file for complete search history.

(56) References Cited

U.S. PATENT DOCUMENTS

| | | | | |
|---|---|---|---|---|
| 3,555,688 A | * | 1/1971 | Smathers | E04G 21/1825 |
| | | | | 33/408 |
| 3,878,617 A | * | 4/1975 | West | B29C 45/26 |
| | | | | 33/369 |
| 4,401,961 A | * | 8/1983 | Baermann | H01F 7/0252 |
| | | | | 335/305 |
| 4,715,161 A | * | 12/1987 | Carraro | E04B 9/127 |
| | | | | 403/241 |
| 5,381,991 A | * | 1/1995 | Stocker | G09F 7/18 |
| | | | | 248/320 |
| 5,479,713 A | * | 1/1996 | Wood | E04G 21/1825 |
| | | | | 33/409 |
| 5,519,976 A | * | 5/1996 | Gee | E04F 21/1838 |
| | | | | 52/715 |
| 5,659,967 A | * | 8/1997 | Dufour | G01C 9/28 |
| | | | | 33/379 |
| 5,711,081 A | * | 1/1998 | Zaccaria | E04G 21/1825 |
| | | | | 33/409 |
| 6,026,581 A | * | 2/2000 | Gruetzmacher | G01C 9/28 |
| | | | | 33/DIG. 1 |
| 6,098,299 A | * | 8/2000 | Collins | B44D 3/38 |
| | | | | 24/122.3 |

(Continued)

*Primary Examiner* — Peter J Macchiarolo
*Assistant Examiner* — Anna Josephine Saunders
(74) *Attorney, Agent, or Firm* — Outlier Patent Attorneys, PLLC

(57) ABSTRACT

An apparatus for attaching an alignment string to a wall angle during an installation of a suspended ceiling includes a right-angle bracket formed of a first plate and a second plate attached along an edge. Two magnets are embedded in a top surface of the first plate, permitting the top surface to be selectively attached firmly to a wall angle during a suspended ceiling installation and then easily disconnected from the wall angle.

17 Claims, 4 Drawing Sheets

(56)                  References Cited

U.S. PATENT DOCUMENTS

| | | | | |
|---|---|---|---|---|
| 6,581,295 B1 * | 6/2003 | Black | G01C 9/28 | |
| | | | | 33/413 |
| 6,996,911 B1 * | 2/2006 | Dinius | G01B 3/566 | |
| | | | | 33/562 |
| 7,009,480 B2 * | 3/2006 | Tsui | B23Q 3/1546 | |
| | | | | 335/287 |
| 7,117,606 B2 * | 10/2006 | Brown | G01C 9/28 | |
| | | | | 33/DIG. 1 |
| 7,207,144 B2 * | 4/2007 | Shepard | E04B 9/064 | |
| | | | | 33/645 |
| 7,409,771 B2 * | 8/2008 | Bond | B65H 75/406 | |
| | | | | 33/409 |
| 8,104,188 B1 * | 1/2012 | Aguilar | E04F 21/18 | |
| | | | | 33/1 LE |
| 8,672,307 B1 * | 3/2014 | Pacheco | B25B 5/06 | |
| | | | | 269/95 |
| 10,118,277 B2 * | 11/2018 | Wong | B25B 11/002 | |
| 11,137,239 B2 * | 10/2021 | Riopel | G01B 5/245 | |
| 2006/0226318 A1 * | 10/2006 | D'Amico | B25B 11/002 | |
| | | | | 248/274.1 |
| 2007/0022690 A1 * | 2/2007 | LaLonde | E04B 9/127 | |
| | | | | 52/506.07 |
| 2023/0349694 A1 * | 11/2023 | Almaguer | E04F 21/185 | |
| 2024/0181576 A1 * | 6/2024 | Lemons | B23K 37/0426 | |

* cited by examiner

TOOL FOR LEVELING AND ALIGNING SUSPENDED CEILING RAILS

CROSS-REFERENCE TO RELATED APPLICATIONS

This application claims priority from U.S. Provisional Application 63/337,067, filed on Apr. 30, 2022.

BACKGROUND

Field of the Art

This disclosure relates to a construction tool useful in installing suspended ceilings. Specifically, a magnetic tool having a notched benchmark indicator is easily attached and detached from a wall angle and permits a leveling string to be tightly secured as the string is stretched for leveling while also permitting the tool to be quickly and easily moved for realigning of the suspended ceiling rails to get them squared.

Discussion of the State of the Art

The present invention is directed to installing suspended ceilings, sometimes also referred to as dropped ceilings. Such installations involve attaching perimeter wall angles to wall studs and then assembling main runners or tees and cross pieces to form a metal grid system, as suspended from ceiling joists, upon which grid system is mounted the ceiling panels. The conventional method of installing suspended ceilings is to first locate and mark locations on the walls to mount the perimeter wall angles, and the perimeter wall angles are typically leveled using a laser level or even a four foot carpenter's level. Once the wall angles are mounted, the installer will then make marks at a predetermined interval, such as two-foot or four-foot intervals, for attaching the runners and tees that will form the metal grid system, into which ceiling panels will be inserted to finish the suspended ceiling.

Once the perimeter wall angle locations are established around the perimeter of the room, the metal grid system is then assembled as stretching across the room from opposing wall angles, as appended by wires from ceiling joists. Typically, the leveling of the metal grid components is done by stretching a string across the room to interval marks opposing wall angles. The leveling string used by many professional installers is speed-line, also known as jet-line or string-line. This standard jet-line string is a bright orange color that stands out for easy visibility and is a high strength line that will not sag or stretch. Jet-line typically comes in a package as 450 feet of string wrapped on a tubular core, initially unwinding from the center of the core in order to prevent tangling and allowing the use of only as much as needed.

Typically, a room is not perfectly square so the runners of the metal grid system must often be adjusted to get the main runners and tees squared up so that the square ceiling panels can be inserted, which means that the runners and tees must be realigned which, in turn, means that the string lines must be moved on the wall angles from their initial attachment locations. Once at least one unit of runners/tees is perfectly square, the attachment points for remaining runners and tees can then be marked along the wall angles, and the remaining runners/tees should all thereby present perfect square units.

Squaring the main runners and tees can be done in various ways, but a common technique well known in the art, since known standard lengths are used for the runner/tee components, is to measure the diagonals of the runners and tees knowing what diagonal length provides the exact hypotenuse of a right angle, in accordance with the Pythagorean theorem, and the known standard lengths for the runner and tee sections. As a check or alternative to relying on a standard measurement when square, the runner/tee components are also perfectly square if both diagonals of the runner/tee section are equal. As the runner and tee is adjusted to square, the string lines stretched across the room are adjusted so that the standard two-foot and four-foot alignment marks on the wall can be adjusted to maintain the squared configuration across the length and width of the room.

To be productive in the construction work field, a ceiling installer has to work smart to get the job done in less time and, by doing so, saves the contractor money. The present inventor has recognized that one of the best ways to work smart is by using the tools that are efficient to make the job run easier and has developed the present invention in view of this concern in his own job as a ceiling installer.

More specifically, conventionally, the string line used in installing acoustical ceilings as a reference to establish a straight line to keep the main runners and tees squared to the room is typically done by attaching the line to the perimeter wall angle at the measurement needed on both sides of the room, and the string line is commonly attached in one of two ways. The first way is by using a rivet, where the string ties to the body then mechanically is inserted between the finish wall and the back of the wall angle. The second way is by using a grid clamp, where the line is secured at the measurement marked.

As a ceiling installer himself, the present inventor has come to recognize that each of these two conventional methods has their own disadvantages as related to efficiency and working smart. For instance, in the technique using a rivet, first, it takes time to tie the string due to it being small to maneuver with your fingers to do a knot, and, second, once it is secured to the back of the wall angle, it damages the finished wall since it is secured between the angle and wall, it also scratches the paint off the wall angle once you take it down. In the technique using clamps, it takes more time to be able to get the line at the exact marked measurement since it has to be pulled and at the same time securing it with the clamp.

SUMMARY

The tool of the present invention has eliminated these and other concerns by making attachments to the wall angle magnetically, thereby eliminating the noted problem of scratching the paint off the wall angle and the wall itself. Use of the tool in accordance with the present invention saves up to one half installation time compared with the conventional methods.

Moreover, the string attachment tool of the present invention has a benchmark indicator in the front center so that it is easy to line up with the marked measurement, unlike the clamp attachment described above. Not only is the string easy to align to a marked measurement because the benchmark indicator is notched so that the string can be easily fastened to the alignment mark as perfectly aligned with the mark, but the string is also tightly secured to the wall angle using a magnet, preferably, in a preferred embodiment, a Neodymium magnet, so when the string is pulled to stretch across the room, it stays put on the reference mark. One end of the stretched string is firmly captured in the installation tool by pulling the string into a slit at the bottom edge of the tool designed dimensionally to firmly hold the string but permitting it to be easily pulled out when desired.

Since almost all ceiling installations involve rooms that are not squared, the secured line must be moved once or twice to be able to get the lines squared up. The string attachment tool of the present invention easily releases from the wall angle by just pulling down on handles on the tool or by pushing the tool into a different location on the wall angle, so that the tool and string can be relocated to a desired new square mark, saving much time during a typical instal- lation compared to relocation times using the conventional attachment mechanisms.

Thus, the string attachment tool of the present invention provides a cost efficient method for leveling and aligning metal grid systems in suspended ceiling installations. The tool is also light weight and is configured to carry a wound core of the jet-line string with it, so everything is at hand for the procedure of leveling and aligning a metal grid system. Since the tool is small, several can be easily carried in a shirt or pants pocket or in a tool carrier pouch.

BRIEF DESCRIPTION OF THE DRAWING FIGURES

The accompanying drawings illustrate several embodi- ments and, together with the description, serve to explain the principles of the invention according to the embodiments. It will be appreciated by one skilled in the art that the par- ticular arrangements illustrated in the drawings are merely exemplary and are not to be considered as limiting of the scope of the invention or the claims herein in any way.

DETAILED DESCRIPTION

Figure 1:
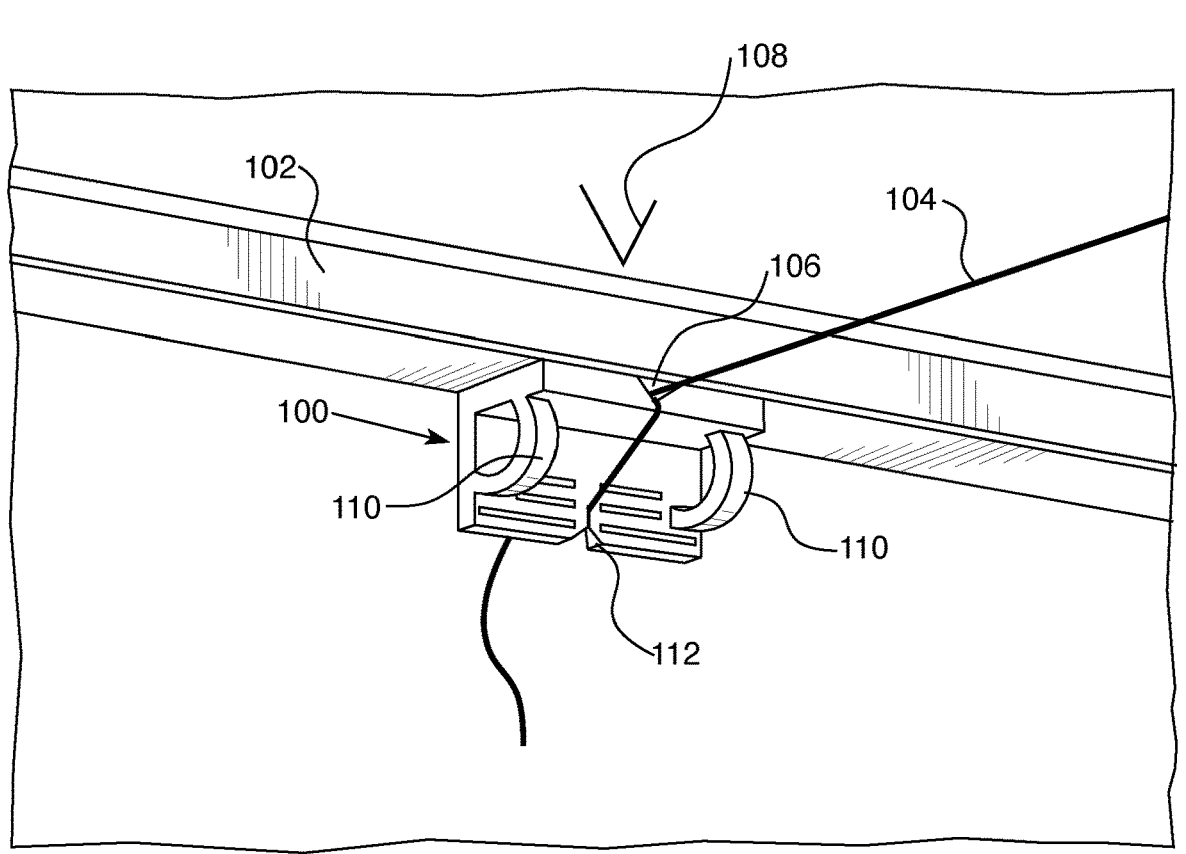
FIG. 1 illustrates an exemplary embodiment of the string attachment tool in a frontal perspective view as attached magnetically to a wall angle.

The present invention provides a lightweight tool that provides an improved cost efficient method for leveling and aligning metal grid systems in suspended ceiling installa- tions.

The invention is described by reference to various ele- ments herein. It should be noted, however, that although the various elements of the inventive apparatus are described separately below, the elements need not necessarily be separate. The various embodiments may be interconnected and may be cut out of a singular block or mold. The variety of different ways of forming an inventive apparatus, in accordance with the disclosure herein, may be varied with- out departing from the scope of the invention.

Generally, one or more different embodiments may be described in the present application. Further, for one or more of the embodiments described herein, numerous alternative arrangements may be described; it should be appreciated that these are presented for illustrative purposes only and are not limiting of the embodiments contained herein or the claims presented herein in any way. One or more of the arrangements may be widely applicable to numerous embodiments, as may be readily apparent from the disclo- sure. In general, arrangements are described in sufficient detail to enable those skilled in the art to practice one or more of the embodiments, and it should be appreciated that other arrangements may be utilized and that structural changes may be made without departing from the scope of the embodiments. Particular features of one or more of the embodiments described herein may be described with ref- erence to one or more particular embodiments or figures that form a part of the present disclosure, and in which are shown, by way of illustration, specific arrangements of one or more of the aspects. It should be appreciated, however, that such features are not limited to usage in the one or more particular embodiments or figures with reference to which they are described. The present disclosure is neither a literal description of all arrangements of one or more of the embodiments nor a listing of features of one or more of the embodiments that must be present in all arrangements.

Headings of sections provided in this patent application and the title of this patent application are for convenience only and are not to be taken as limiting the disclosure in any way.

Devices and parts that are connected to each other need not be in continuous connection with each other, unless expressly specified otherwise. In addition, devices and parts that are connected with each other may be connected directly or indirectly through one or more connection means or intermediaries.

A description of an aspect with several components in connection with each other does not imply that all such components are required. To the contrary, a variety of optional components may be described to illustrate a wide variety of possible embodiments and in order to more fully illustrate one or more embodiments. Similarly, although process steps, method steps, or the like may be described in a sequential order, such processes and methods may gener- ally be configured to work in alternate orders, unless spe- cifically stated to the contrary. In other words, any sequence or order of steps that may be described in this patent application does not, in and of itself, indicate a requirement that the steps be performed in that order. The steps of described processes may be performed in any order practi- cal. Further, some steps may be performed simultaneously despite being described or implied as occurring non-simul- taneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the embodiments, and does not imply that the illustrated process is preferred. Also, steps are generally described once per aspect, but this does not mean they must occur once, or that they may only occur once each time a process, or method is carried out or executed. Some steps may be omitted in some embodiments or some occur- rences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other embodiments need not include the device itself.

Techniques and mechanisms described or referenced herein will sometimes be described in singular form for clarity. However, it should be appreciated that particular embodiments may include multiple iterations of a technique or multiple instantiations of a mechanism unless noted otherwise. Alternate implementations are included within the scope of various embodiments in which, for example, functions may be executed out of order from that shown or discussed, including substantially concurrently or in reverse order, depending on the functionality involved, as would be understood by those having ordinary skill in the art.

Overview

The apparatus of the present invention, as based on a magnet, provides a new method of attaching ceiling alignment strings to wall angles that permits easy alignment to reference marks and that can be easily moved for the purpose of squaring up, without damage to either the wall or the wall angle.

Apparatus

FIG. 1 illustrates the inventive magnetic string attachment tool 100 in accordance with an embodiment of the invention. In particular, FIG. 1 illustrates the tool 100 as attached to wall angle 102, with jet-line string 104 stretched out to the opposite wall (not shown in the figure). The string 104 is secured in a slit in the notch 106, thereby locating the string easily and securely relative to the alignment reference mark 108. By magnetically attaching to the wall angle 102, the tool eliminates the scratching of paint off the wall angle and the wall itself, thereby addressing a concern with the conventional attachment method using rivets.

Additionally, the notch 106 serves as a benchmark indicator in the center to easily line up with the marked measurement 108, which addresses the concern of difficult alignment using conventional clamps. In a preferred exemplary embodiment, the tool 100 and string 104 are firmly secured to the wall angle 102 by Neodymium magnets so when the string 104 is pulled to stretch it across the room, the tool 100 stays firmly attached to the wall angle 102, but the tool 100 can also be easily detached from the wall angle 102 by pulling down on the two handles 110.

The prototype exemplarily shown in the figures is approximately ⅞" wide/high by 2" in length and is made of extruded polyurethane, and two magnets (not visible in the figures) are embedded inside preformed cavities and glued in place. The notch 106 at the bottom edge includes a slit 112 that is sized to allow the string 104 to be slipped into this string slot 112 for the purpose of holding the string 104 securely to the tool so that the string 104 can then be stretched across the room. The tool 100 can be disengaged from the wall angle 102 by grasping the front handles 110 and pulling the tool away from the wall angle 102.

As mentioned, most of the time the rooms of a suspended ceiling installation are not squared, meaning that the secured line must be moved once or twice to be able to get the lines squared. The attachment tool 100 easily releases by just grasping the tool and pulling down and can be relocated to a desired new squared mark either by first removing the tool and moving to a new location or by simply sliding the tool along the wall angle to a new location, thereby saving lots of time compared to time and effort to relocate the conventional attachment tools.

Figure 2:
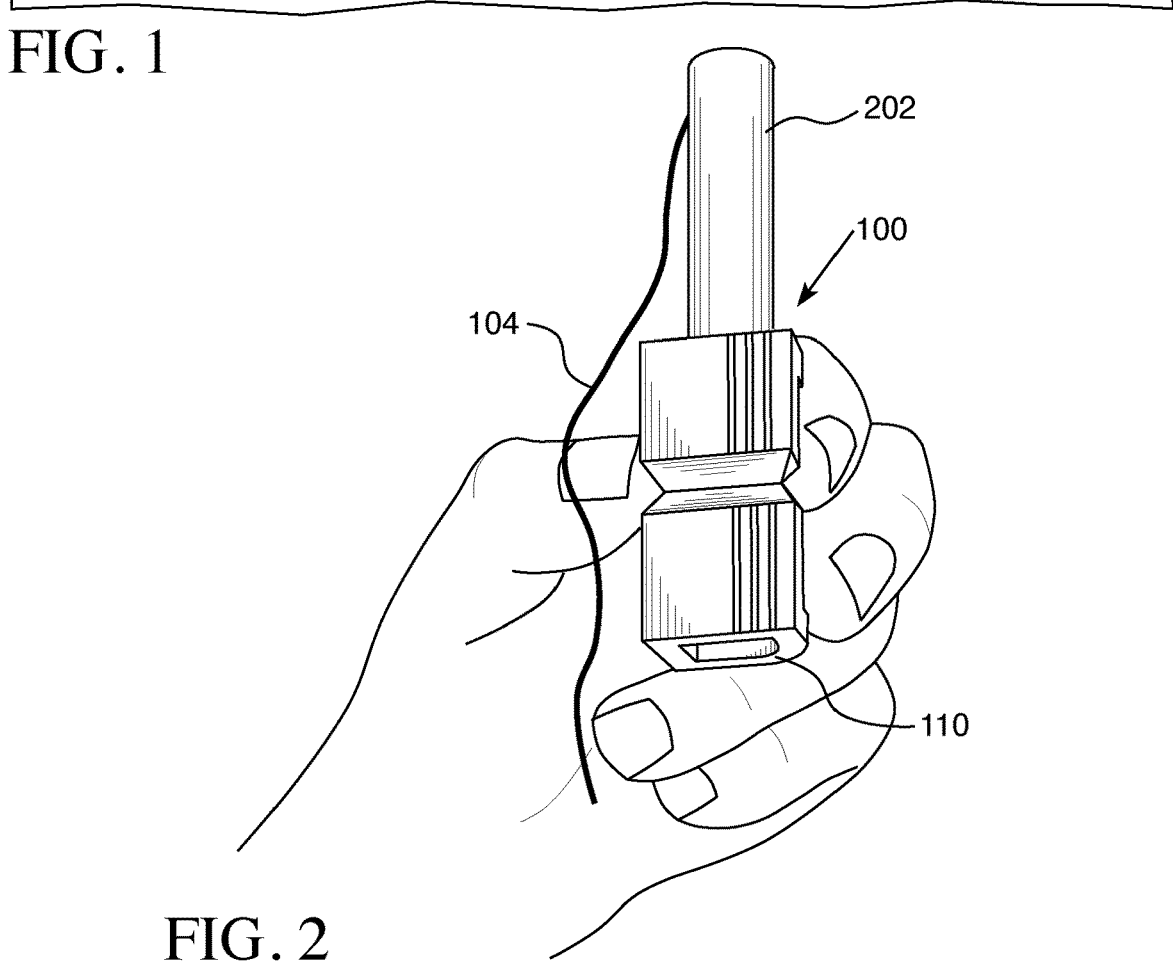
FIG. 2 is a view of the back side of an exemplary embodiment of the magnetic string attachment tool.
Figure 3A:
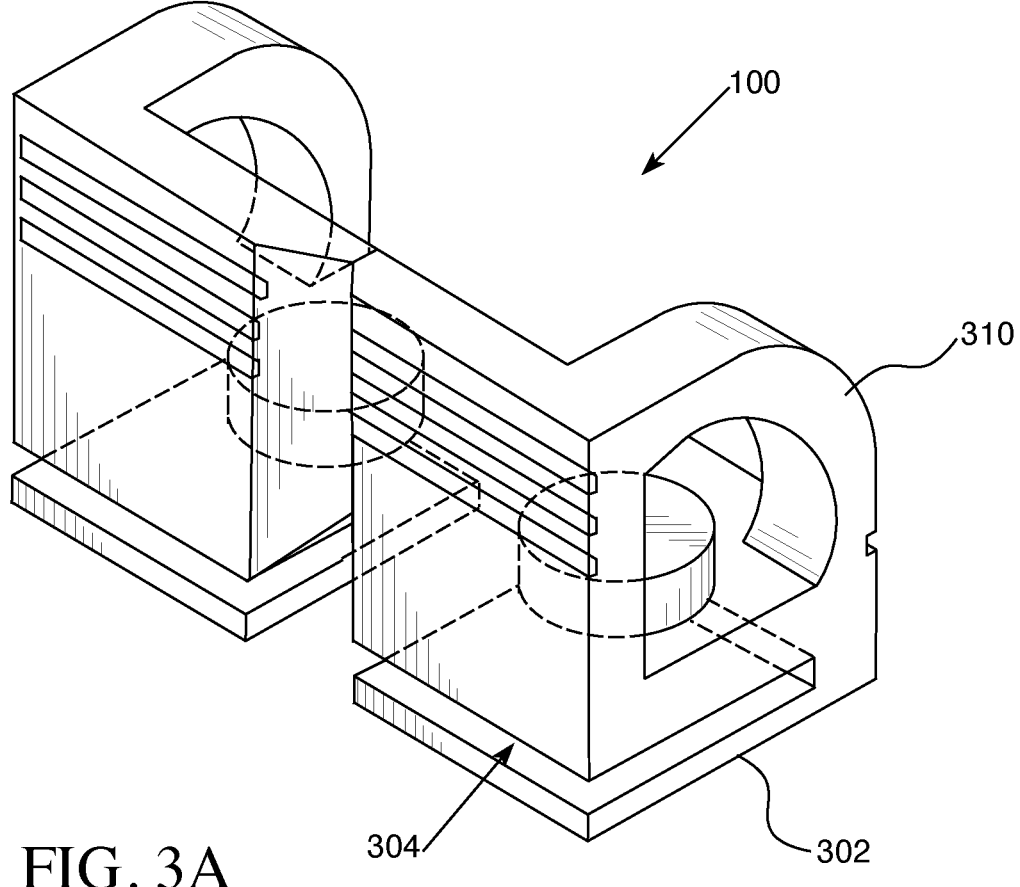
FIGS. 3A-3D show a perspective view, a top view, a front view, and a side view, respectively, of a preferred exemplary embodiment of the attachment tool in which the front handles are shaped to hold a standard core of jet-line.
Figure 3B:
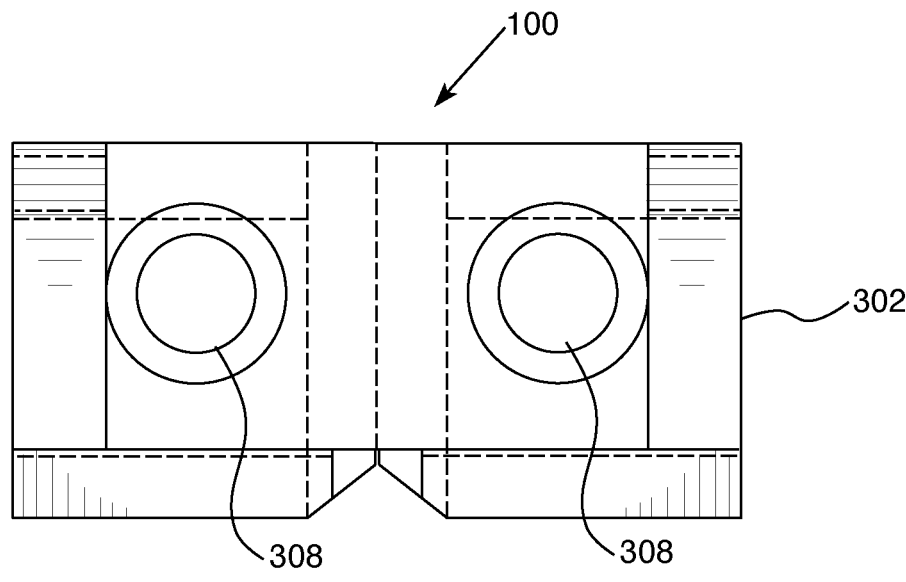
Figure 3C:
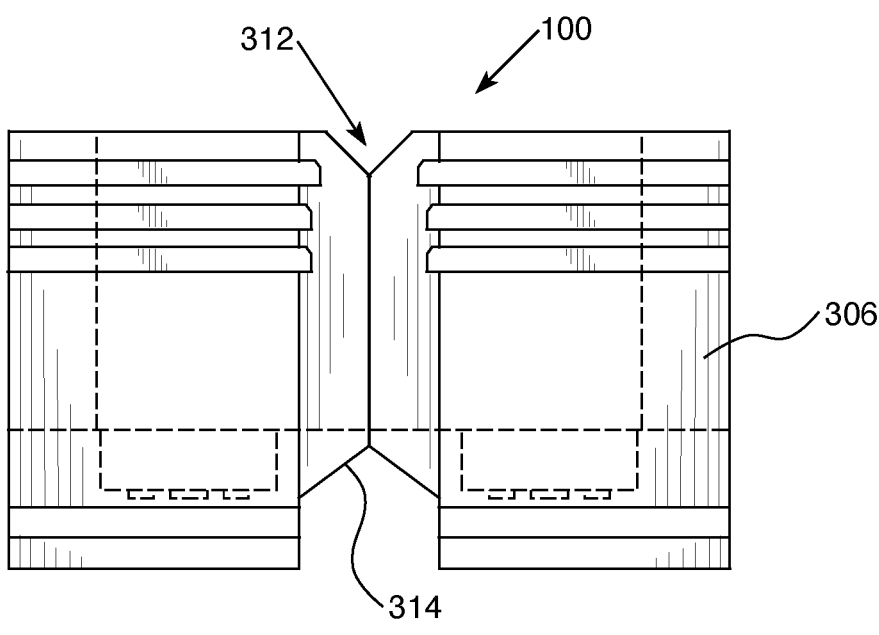
Figure 3D:
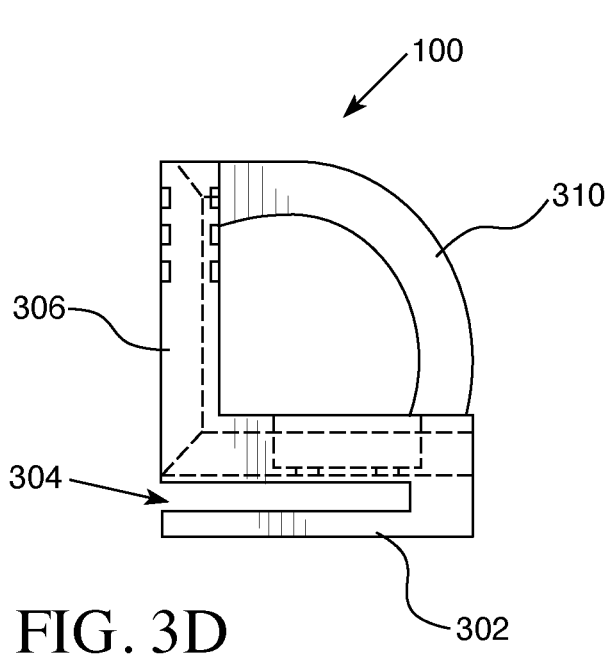

FIG. 2 shows a back view of the magnetic string attachment tool and demonstrates how, in this preferred embodiment, the front handles 110 will accommodate a conventional package of jet-line 202, so that everything necessary for a leveling/squaring procedure can be carried conveniently as a kit. The tool 100 is conveniently small so that several tools and jet-line packs will easily fit in a tool pouch or in pockets. As illustrated in FIG. 2, the tool 100 is sized and shaped to be held in a human hand. The tool 100 is smaller than the palm of a human hand.

In typical application, two tools are used to stretch a string 104 across a room, that is, one tool on each side of the room. The string 104 is attached to the string slot 112 to one tool 100, which is then attached to the wall angle on one side of the room. The jet-line package wound on its core 202 is then inserted in the two handles 110 of the second tool, as demonstrated in FIG. 2, so that the attached string 104 can be conveniently unwound as it is carried and stretched across the room in the second tool and pulling the string to the opposite wall. The stretched string is then fitted into the string slot of the second tool, which is attached to the wall angle across the room from the first tool.

FIGS. 3A-3D show the tool 100 in a perspective view, a top view, a front view, and a side view, respectively. The body of the tool can be fabricated using, for example, a plastic material such as polyurethane that could be extruded/pulled/molded. The tool 100 includes a top surface 302 and a back surface 306 joined together at a right angle. The top surface 302 has two cavities 304 into which magnets 308 are inserted and held in place by any appropriate adhesive. The preferred embodiment also has front handles 310 shaped to accommodate a standard core of jet-line as wound up to slip into the front handles 310. Grooves 312 along the middle of the top and back sides 302, 306 of the tool 100 provide for a sharp alignment of the jet-line when stretched across a room, with string slits 314 to permit an end of the string to be firmly held in the tool grooves and resultant notches 312.

Figure 4:
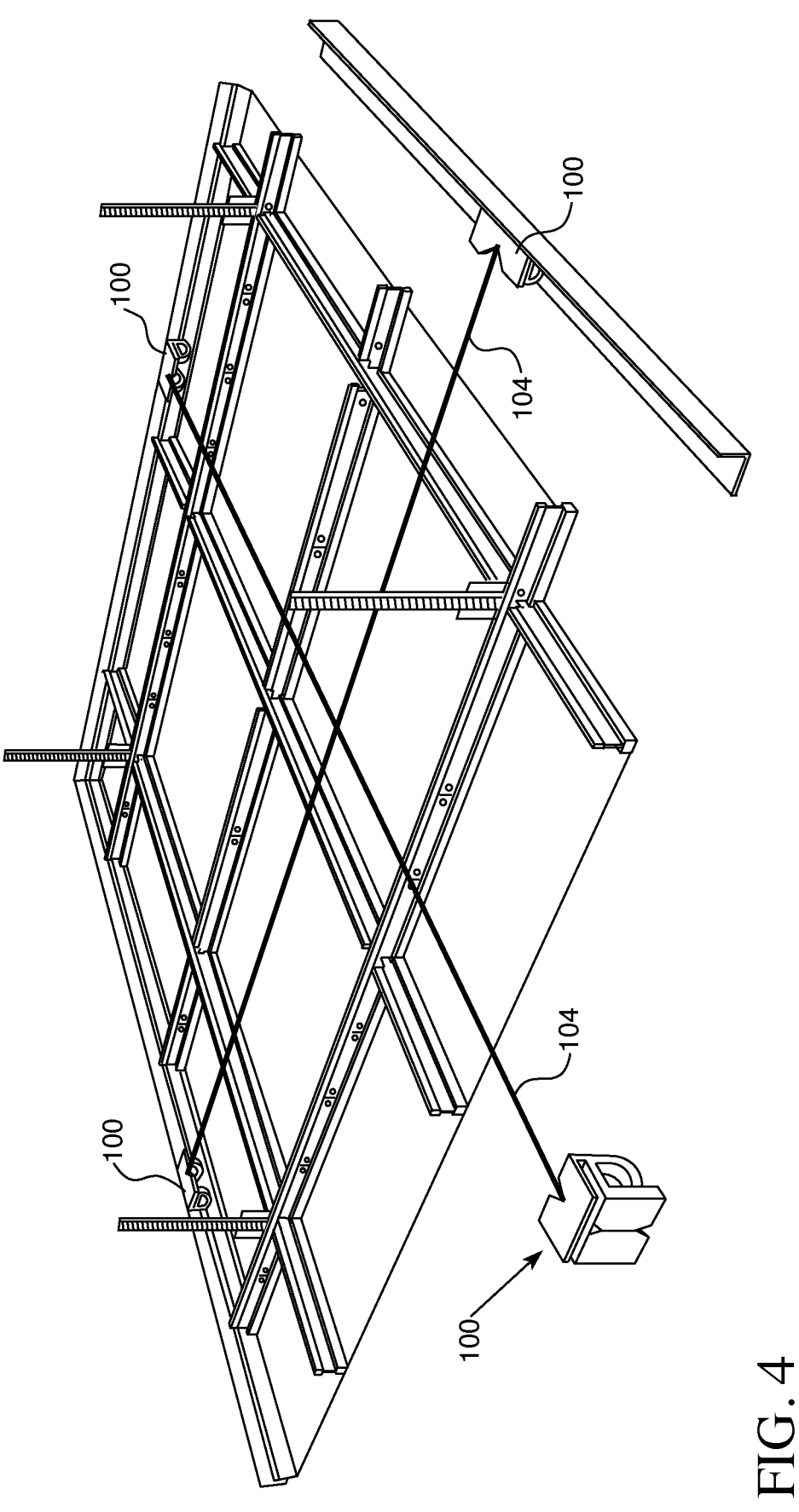
FIG. 4 shows four attachment tools of the present inven- tion as used for a typical squaring sequence in a suspended ceiling installation.

FIG. 4 shows how four of the inventive tools are used to stretch two jet-line strings crisscross across a room. Typically, squaring is done for one of the internal panel spaces since the end panel spaces can be non-standard dimensions to provide a better visual appearance and to permit minor adjustments to each ceiling panel due to the room being non square. When the internal panel space is squared by measuring its diagonal(s), the jet-lines are shifted as appropriate along the wall angles so that alignment marks can be made along the wall angles for remaining panel spaces, all of which should result in squared panel spaces due to the squaring of the one internal panel space.

It should be clear from the above description that the tool of the present invention provides an efficient way to temporarily attach and stretch string across room wall angles as a procedure to level and square up the metal grid system of a suspended ceiling.

From the figures, it should be clear that the exemplary preferred embodiment of the tool of the invention can be described in various ways. For example, it can be described as a right angle bracket formed as a first plate connected along an edge with a second plate to be magnetically attached to a suspended ceiling wall bracket, where each plate has a V notch channel formed on their outer surface, to form a string slot permitting alignment string to be selectively and temporarily attached to the tool at an alignment mark for alignment. In the exemplary embodiment, two magnets are embedded in the outer surface of one of the plates, although it should be clear that a different number of magnets could be used. Additionally, although the exemplary embodiment is constructed of polyurethane, it should be clear that other materials could be used, including even fabricating the tool using a magnetic material. The right angle bracket has two handles shaped to be able to hold a roll of alignment string such that a roll of alignment string can be unwound as the tool and string packet is carried across the room and to hold the tool for the purpose of attaching and detaching the tool from a wall angle.

Another way of describing the tool of the present invention is that it comprises a hand-size bracket alignment tool, having a top bracket component and a back bracket component formed at substantially a right angle, and a holding component formed on each end of the alignment tool. The top bracket component has at least one cavity for a magnet to be embedded in its upper surface so that the alignment tool can be magnetically attached to a suspended ceiling wall angle. Both the top bracket and the back bracket have a "V" notch channel formed in a centerline of their outer surfaces to serve as an alignment marker for the alignment tool, to permit an alignment string to be slipped into the string slot and held securely for purpose of stretching the alignment line string across a room. The two bracket holding components are shaped with a circular form and sized to accommodate a core wound with alignment string, so that the alignment string can be unwound if one end of the alignment string is secured to a wall angle using a first tool and a second tool with the core of alignment string is moved away from the securing location.

Another interpretation of the tool disclosed herein is that it provides a quick connect/disconnect tool that can be selectively attached magnetically to a metal surface. Although the quick connect/disconnect tool was described herein as an attachment tool to assist in suspended ceiling installations, one of ordinary skill would readily understand that the quick connect/disconnect tool could be useful in other applications, particularly applications in a string is used as a guide and one end of the string is to be temporarily attached magnetically to a metal surface.

Additional Considerations

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for creating an interactive message through the disclosed principles herein. Thus, while particular embodiments and applications have been illustrated and described, it is to be understood that the disclosed embodiments are not limited to the precise construction and components disclosed herein. Various apparent modifications, changes and variations may be made in the arrangement, operation and details of the method and apparatus disclosed herein without departing from the spirit and scope defined in the appended claims.

What is claimed is:

1. An apparatus for attaching an alignment string to a wall angle during an installation of a suspended ceiling, the apparatus comprising:
a right-angle bracket formed of a first plate and a second plate attached along an edge, the first plate having a first outer surface and a first inner surface and the second plate having a second outer surface and a second inner surface;
at least one magnet embedded in the first outer surface, permitting the first outer surface to be selectively magnetically attached to a wall angle of a suspended ceiling installation;
a first handle extending between the first inner surface and the second inner surface on a first end of the apparatus; and
a second handle extending between the first inner surface and the second inner surface on a second end of the apparatus,
wherein the first handle and the second handle are configured for holding a tube of alignment string positioned between the first inner surface and the second inner surface.

2. The apparatus of claim 1, wherein the first plate and the second plate are configured with a centerline notch to serve as alignment marks on the apparatus.

3. The apparatus of claim 1, further comprising a slit at a bottom edge of the second plate to serve to hold an end of an alignment string being stretched across a room for a guide to alignment components used in the suspended ceiling installation.

4. The apparatus of claim 1, wherein two magnets are embedded in the first outer surface of the first plate.

5. The apparatus of claim 1, wherein the at least one magnet comprises a Neodymium magnet.

6. The apparatus of claim 1, wherein the first plate and the second plate are made of a rigid plastic material.

7. A method of installing suspended ceiling panels using the apparatus of claim 1, the method comprising:
attaching metal wall brackets at a predetermined height on walls of a room; and
using the apparatus as a quick connect/disconnect mechanism for an alignment string used in the suspended ceiling panel installation.

8. A quick connect/disconnect tool, comprising:
an L-shaped bracket having a top bracket component and a back bracket component, the top bracket component having a top outer surface and a top inner surface, and the back bracket component having a back outer surface and a back inner surface;

at least one magnet on the top outer surface of the top bracket component, to permit the L-shaped bracket to be selectively attached magnetically to a metal surface;

a first handle extending between the top inner surface and the back inner surface on a first end of the L-shaped bracket; and a second handle extending between the top inner surface and the back inner surface on a second end of the L-shaped bracket, wherein the first handle and the second handle are configured for holding a tube of alignment string positioned between the top inner surface and the back inner surface.

9. The quick connect/disconnect tool of claim 8, wherein the at least one magnet is affixed to the top bracket component as embedded in a cavity in the top outer surface.

10. The quick connect/disconnect tool of claim 8, wherein the at least one magnet comprises at least two magnets.

11. The quick connect/disconnect tool of claim 8, wherein the at least one magnet comprises a Neodymium magnet.

12. The quick connect/disconnect tool of claim 8, wherein the L-shaped bracket is made of rigid plastic.

13. The quick connect/disconnect tool of claim 8, wherein a bottom edge of the back bracket component includes a slit into which an end of a string can be inserted and rigidly held, the quick connect/disconnect tool thereby serving as a quick connect/disconnect tool for temporarily attaching an alignment string to the metal surface.

14. The quick connect/disconnect tool of claim 8, wherein the tool is approximately 2 inches long and less than 1 inch wide.

15. The apparatus of claim 1, wherein the apparatus is configured such that, when the first outer surface is magnetically attached to the wall angle, the first outer surface and the second outer surface are in direct contact with the wall angle.

16. The apparatus of claim 1, wherein the first plate comprises a first notch in a middle thereof and the second plate comprises a second notch in a middle thereof.

17. The quick connect/disconnect tool of claim 8, wherein the top bracket component comprises a first notch in a middle thereof and the second bracket component comprises a second notch in a middle thereof.

* * * * *